(12) United States Patent
Mori

(10) Patent No.: US 12,528,455 B2
(45) Date of Patent: Jan. 20, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Tatsunori Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 18/441,137

(22) Filed: Feb. 14, 2024

(65) Prior Publication Data

US 2024/0409086 A1    Dec. 12, 2024

(30) Foreign Application Priority Data

May 26, 2023  (JP) .................. 2023-086842

(51) Int. Cl.
| | |
|---|---|
| *B60W 30/06* | (2006.01) |
| *B60W 10/26* | (2006.01) |
| *B60L 50/40* | (2019.01) |
| *B60L 50/60* | (2019.01) |

(52) U.S. Cl.
CPC .......... *B60W 30/06* (2013.01); *B60W 10/26* (2013.01); *B60L 50/40* (2019.02); *B60L 50/60* (2019.02); *B60W 2510/244* (2013.01); *B60W 2710/242* (2013.01)

(58) Field of Classification Search
None
See application file for complete search history.

(56) References Cited

U.S. PATENT DOCUMENTS

| | | | |
|---|---|---|---|
| 8,903,567 B2 | 12/2014 | Morimoto et al. | |
| 10,464,554 B2 | 11/2019 | Okamura et al. | |
| 11,993,253 B2 * | 5/2024 | Watanabe | G08G 1/143 |
| 12,093,593 B2 * | 9/2024 | Noguchi | B60L 3/04 |
| 2015/0012175 A1 * | 1/2015 | Hara | B60W 10/08 |
| | | | 701/36 |
| 2016/0311419 A1 * | 10/2016 | Joyce | B60T 17/221 |
| 2017/0256982 A1 * | 9/2017 | Kumar K N | H02J 1/108 |
| 2018/0022329 A1 * | 1/2018 | Sannodo | B60T 13/662 |
| | | | 701/70 |

(Continued)

FOREIGN PATENT DOCUMENTS

| | | |
|---|---|---|
| JP | 2021-014173 A | 2/2021 |
| JP | 2021-090246 A | 6/2021 |

*Primary Examiner* — Jonathan M Dager
(74) *Attorney, Agent, or Firm* — SoraIP, Inc.

(57) ABSTRACT

A vehicle control device includes: a first control unit configured to charge a power storage element of a secondary power supply to a predetermined value; a second control unit configured to, when the power storage element is charged to the predetermined value, execute an automated parking function by outputting first electric power at a specified voltage from a primary power supply to an automated parking system while continuing to charge the power storage element; a third control unit configured to detect a sign of failure of the primary power supply during execution of the automated parking function; and a fourth control unit configured to, when the sign of failure of the primary power supply is detected, output second electric power at a voltage lower than the specified voltage from the secondary power supply to the automated parking system in parallel with the first electric power.

8 Claims, 3 Drawing Sheets

(56) References Cited

U.S. PATENT DOCUMENTS

| | | | | |
|---|---|---|---|---|
| 2019/0061653 | A1* | 2/2019 | Takahashi | B60L 53/20 |
| 2019/0126761 | A1* | 5/2019 | Verbridge | H01M 10/4207 |
| 2019/0128965 | A1* | 5/2019 | Park | H02J 7/00 |
| 2019/0165602 | A1* | 5/2019 | Morita | F16H 61/28 |
| 2019/0232793 | A1* | 8/2019 | Atluri | H02J 7/34 |
| 2019/0232902 | A1* | 8/2019 | Teng | H02J 1/10 |
| 2019/0302754 | A1 | 10/2019 | Tsuruoka | |
| 2020/0070753 | A1* | 3/2020 | Akuzawa | B60L 1/10 |
| 2020/0218249 | A1 | 7/2020 | Sannodo et al. | |
| 2021/0009102 | A1* | 1/2021 | Nakayama | B60T 8/885 |
| 2021/0086655 | A1* | 3/2021 | Li | B60L 3/0015 |
| 2021/0171062 | A1* | 6/2021 | Hecker | B60W 60/0015 |
| 2021/0197772 | A1 | 7/2021 | Tsumano | |
| 2022/0009481 | A1* | 1/2022 | Inoue | B60W 10/18 |
| 2022/0063591 | A1* | 3/2022 | Inoue | B60W 50/0205 |
| 2022/0063600 | A1* | 3/2022 | Inoue | B60W 40/105 |
| 2022/0153285 | A1* | 5/2022 | Ide | B60R 16/0232 |
| 2024/0199054 | A1* | 6/2024 | Shimamoto | B62D 15/0285 |
| 2024/0329629 | A1* | 10/2024 | Tsuruoka | G05D 1/0011 |

* cited by examiner

VEHICLE CONTROL DEVICE AND VEHICLE CONTROL METHOD

CROSS-REFERENCE TO RELATED APPLICATION

This application claims priority to Japanese Patent Application No. 2023-086842 filed on May 26, 2023, incorporated herein by reference in its entirety.

BACKGROUND

1. Technical Field

The present disclosure relates to a device and method for controlling a redundant power supply system mounted on a vehicle.

2. Description of Related Art

A vehicle control device disclosed in Japanese Unexamined Patent Application Publication No. 2021-014173 (JP 2021-014173 A) backs up an automated parking function in a vehicle by an auxiliary power supply system (secondary power supply) when a main power supply system (primary power supply) fails during execution of the function. The vehicle control device described in JP 2021-014173 A charges a capacitor in the secondary power supply before the start of remote parking. After the charging of the capacitor is completed, the vehicle control device executes remote parking in a state in which parallel power feeding can be executed by both the primary power supply and the secondary power supply. This control enables necessary fail-safe operation using the secondary power supply when the primary power supply fails during remote parking.

SUMMARY

The automated parking function includes, in addition to the remote parking in which intervention of a driver is required for execution of control, valet parking in which intervention of a driver is not required for execution of control. The valet parking generally tends to require a longer control period than that of the remote parking because control is executed without intervention of a driver. Therefore, the valet parking requires a larger amount of electric power to be stored for backup when the primary power supply fails as compared with the remote parking.

Therefore, if the related-art backup control method using the secondary power supply assuming the remote parking is applied directly to the valet parking, there is a possibility that the amount of electric power stored in the capacitor is insufficient and the necessary fail-safe operation cannot be executed. By increasing the capacity of the capacitor, it is possible to cope with the deficiency of electric power. However, the increase in the capacity of the capacitor is not preferable because the cost, size, and the like of the redundant power supply system increase. Therefore, there is room for further study on the backup control using the secondary power supply in the case where the primary power supply fails during execution of the automated parking function including the valet parking.

The present disclosure has been made in view of the above problem, and an object thereof is to provide a vehicle control device and a vehicle control method in which backup power feeding necessary for an automated parking function including valet parking by a secondary power supply can suitably be executed when a primary power supply fails during execution of the automated parking function.

One aspect of the disclosed technology for solving the above problem relates to a vehicle control device configured to control a redundant power supply system including a primary power supply and a secondary power supply configured to supply electric power to an automated parking system. The vehicle control device includes:
- a first control unit configured to charge a power storage element of the secondary power supply to a predetermined value;
- a second control unit configured to, when the power storage element is charged to the predetermined value, execute an automated parking function by outputting first electric power at a specified voltage from the primary power supply to the automated parking system while continuing to charge the power storage element;
- a third control unit configured to detect a sign of failure of the primary power supply during execution of the automated parking function; and
- a fourth control unit configured to, when the sign of failure of the primary power supply is detected, output second electric power at a voltage lower than the specified voltage from the secondary power supply to the automated parking system in parallel with the first electric power.

With the vehicle control device and the vehicle control method of the present disclosure, the backup power feeding necessary for the automated parking function by the secondary power supply can suitably be executed when the primary power supply fails during execution of the remote parking or the valet parking.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The vehicle control device and method of the present disclosure keep the capacitor of the sub power supply for backup charged while there is no sign of failure of the main power supply in the backup standby control state during execution of the automated parking function of the vehicle. By this control, the discharge of the capacitor during the backup standby control is suppressed. As a result, a large amount of power storage of the capacitor is ensured when a failure actually occurs in the main power supply. The vehicle control device and method of the present disclosure can contribute to the execution of the fail-safe operation of the automated parking function having a large amount of required electric power.

Hereinafter, an embodiment of the present disclosure will be described in detail with reference to the drawings.

Embodiment

Configuration

Figure 1:
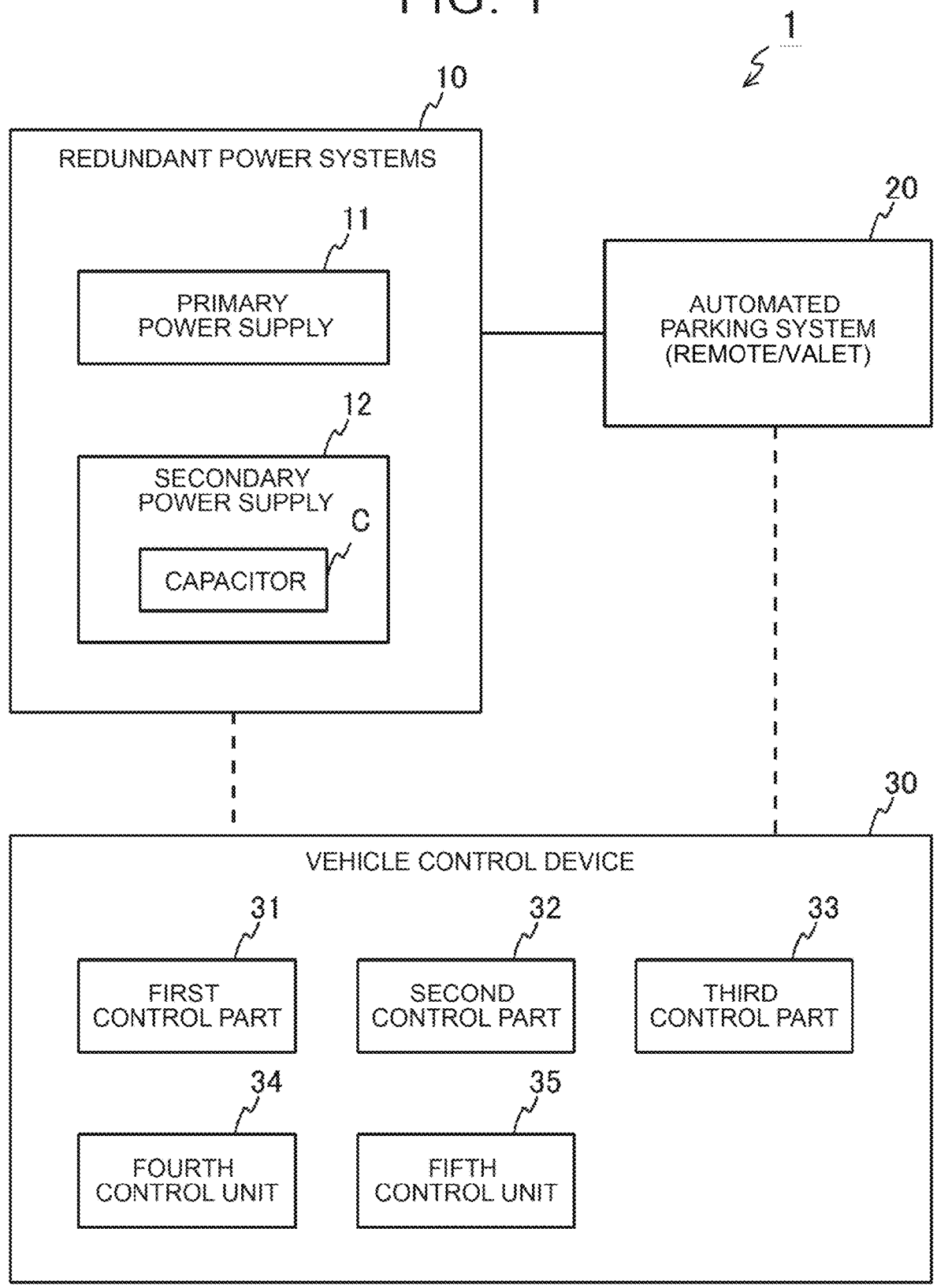
FIG. 1 is a schematic configuration diagram of a vehicle control device according to an embodiment of the present disclosure and a vehicle system including a peripheral portion thereof.

FIG. 1 is a schematic configuration diagram of a vehicle control device 30 and a vehicle system 1 including a peripheral portion thereof according to an embodiment of the present disclosure. The vehicle system 1 illustrated in FIG. 1 includes a redundant power supply system 10, an automated parking system 20, and a vehicle control device 30. The vehicle system 1 is mounted on a vehicle such as, for example, hybrid electric vehicle (HEV), plug-in hybrid electric vehicle (PHEV), and battery electric vehicle (BEV). In FIG. 1, a connection line through which electric power flows is indicated by a solid line, and a connection line through which a detection signal, a control signal, or the like flows is indicated by a dotted line.

The redundant power supply system 10 is a configuration for supplying power to the automated parking system 20, which is one of the power consumption loads installed in the vehicle. The redundant power supply system 10 includes a primary power supply 11 and a secondary power supply 12.

The primary power supply 11 functions as a main battery that supplies power to the automated parking system 20 in a normal state in which no abnormality such as a power failure has occurred. The primary power supply 11 includes a secondary battery (not shown) configured to be chargeable and dischargeable, such as a lead-acid battery or a lithium-ion battery. The power of the primary power supply 11 (secondary batteries) is typically outputted to the automated parking system 20 via DCDC converters, relays, diodes, and the like (not shown). The output of the primary power supply 11 is suitably controlled by the vehicle control device 30.

The secondary power supply 12 functions as a backup sub-battery that supplies power to the automated parking system 20 in place of the primary power supply 11 in an emergency where an abnormality such as a failure of the primary power supply 11 occurs. The secondary power supply 12 includes a capacitor C as a chargeable and dischargeable power storage element. The power of the secondary power supply 12 (capacitor C) is typically outputted to the automated parking system 20 via DCDC converters, relays, diodes, and the like (not shown) in emergencies. Further, the capacitor C is configured to be chargeable by electric power of the primary power supply 11. Input/output of the secondary power supply 12 is suitably controlled by the vehicle control device 30.

The automated parking system 20 is a configuration for realizing an automated parking function by a vehicle. When the automated parking system 20 receives an instruction to execute an automated parking function by a driver or the like, the automated parking system 20 controls the driving force, the braking force, the shift position, the steering angle, and the like of the vehicle based on the information of the vehicle and the vicinity of the vehicle measured by various sensors included in the vehicle. Examples of the electronic control unit (ECU) and actuators to be controlled include electric power steering (EPS), advanced driving assistance (ADAS), shift-by-wire (SBW), and electric braking (EBK).

Automated parking functions include remote parking and valet parking. The remote parking includes, for example, a mode in which the vehicle is parked in a parking space in response to an instruction from a driver seated in the driver's seat, or a mode in which the vehicle is parked in a parking space in response to an instruction from a driver who gets off in the vicinity of the parking space. In the valet parking, for example, there is a mode in which, upon receiving an instruction from a driver who gets off at an entrance of a parking lot, the vehicle moves to a parking space in the parking lot and parks in the parking space.

The vehicle control device 30 is configured to control the redundant power supply system 10 to control power supply from the redundant power supply system 10 to the automated parking system 20. Various kinds of control performed by the vehicle control device 30 may be classified by, for example, the functional blocks of the first control unit 31, the second control unit 32, the third control unit 33, the fourth control unit 34, and the fifth control unit 35. Note that the number of functional blocks and the details of processing performed by each functional block are not limited to the details described below.

The first control unit 31 performs control to charge the capacitor C of the secondary power supply 12 to a predetermined value with the electric power of the primary power supply 11. This predetermined value is not the maximum amount of power required to perform all the automated parking functions in the automated parking system 20. The predetermined value is an amount of electric power required to complete a predetermined fail-safe operation (FOP) in the automated parking system 20 when the primary power supply 11 fails. In a case where the capacitor C having a capacitance covering the maximum amount of electric power is used for the secondary power supply 12, the predetermined value is set to a capacitance value smaller than the full charge capacitance value of the capacitor C.

When the capacitor C is charged to a predetermined value by the first control unit 31, the second control unit 32 determines whether or not there is an instruction from a driver of the vehicle or the like to request the automated parking system 20 to execute the automated parking function. Then, when there is an instruction to request execution of the automated parking function, the second control unit 32 performs the automatic parking backup standby control of the first stage. The automatic parking backup standby control in the first stage is a control in which electric power is supplied from the primary power supply 11 to the automated parking system 20 (output ON) and the electric power is not supplied from the secondary power supply 12 to the automated parking system 20 (output OFF) and the capacitor C is continuously charged. At this time, the output voltage of the primary power supply 11 of the electric power supplied to the automated parking system 20 is controlled to a prescribed voltage suitable for the automated parking system 20. The prescribed voltage is, for example, a voltage (12 V or the like) that can drive the actuators of the automated parking system 20.

The third control unit 33 determines whether or not there is a sign of a failure such as a power loss in the primary power supply 11. As an example, by detecting that the output voltage of the primary power supply 11 has decreased to a predetermined threshold (for example, 11 V), a sign of failure of the primary power supply 11 can be grasped. Alternatively, by detecting that ADAS domain controller included in the automated parking system 20 is less than or equal to a predetermined threshold (for example, 9.5 V), a sign of failure of the primary power supply 11 can be grasped. Alternatively, a sign of failure of the primary power supply 11 can be grasped by detecting that VCS becomes equal to or less than a predetermined threshold (for example, 10 V).

The third control unit 33 may set different conditions for predicting the failure of the primary power supply 11 between the remote parking and the valet parking. For example, a sign of failure of the primary power supply 11 may be detected when the first condition is satisfied during remote parking, and a sign of failure of the primary power supply 11 may be detected when the second condition different from the first condition is satisfied during valet parking. Since valet parking is faster than remote parking, it is necessary to increase the minimum guaranteed voltage of the redundant power supply system 10. If the same conditions are set for the remote parking and the valet parking, there is a possibility that erroneous detection of a failure of the primary power supply 11 in the valet parking increases. Therefore, for example, it is conceivable to set the voltage threshold for valet parking (second condition) higher than the voltage threshold for remote parking (first condition).

When the third control unit 33 determines that there is a sign of failure of the primary power supply 11, the fourth control unit 34 performs the second-stage automatic parking backup standby control. This second-stage automatic parking backup standby control is a control in which electric power (first electric power) is supplied from the primary power supply 11 to the automated parking system 20 (output ON), and in parallel, electric power (second electric power) is supplied from the secondary power supply 12 to the automated parking system 20 (output ON). In this second stage, for the power supplied to the automated parking system 20, the output voltage of the primary power supply 11 is controlled to a prescribed voltage suitable for the automated parking system 20, but the output voltage of the secondary power supply 12 is controlled to a voltage lower than the prescribed voltage. This voltage difference allows the power of the primary power supply 11 to be supplied to the automated parking system 20 preferentially over the power of the secondary power supply 12. The capacitor C is charged or discharged according to a voltage difference.

When the primary power supply 11 actually fails, the fifth control unit 35 performs automatic parking backup control for supplying electric power from the secondary power supply 12 to the automated parking system 20. The automatic parking back-up control is a control in which a power supply path from the primary power supply 11 to the automated parking system 20 is cut off (output OFF) and power (third power) is supplied from the secondary power supply 12 to the automated parking system 20 (output ON). Therefore, the output voltage of the secondary power supply 12 of the electric power supplied to the automated parking system 20 is controlled to be a specified voltage.

Note that a part or all of the above-described vehicle control device 30 may typically be configured as an electronic control unit (ECU) including a processor, a memory, an input/output interface, and the like. The electronic control unit can realize all or a part of the functions performed by the first control unit 31, the second control unit 32, the third control unit 33, the fourth control unit 34, and the fifth control unit 35 by the processor reading and executing the program stored in the memory.

Control

Figure 2A:
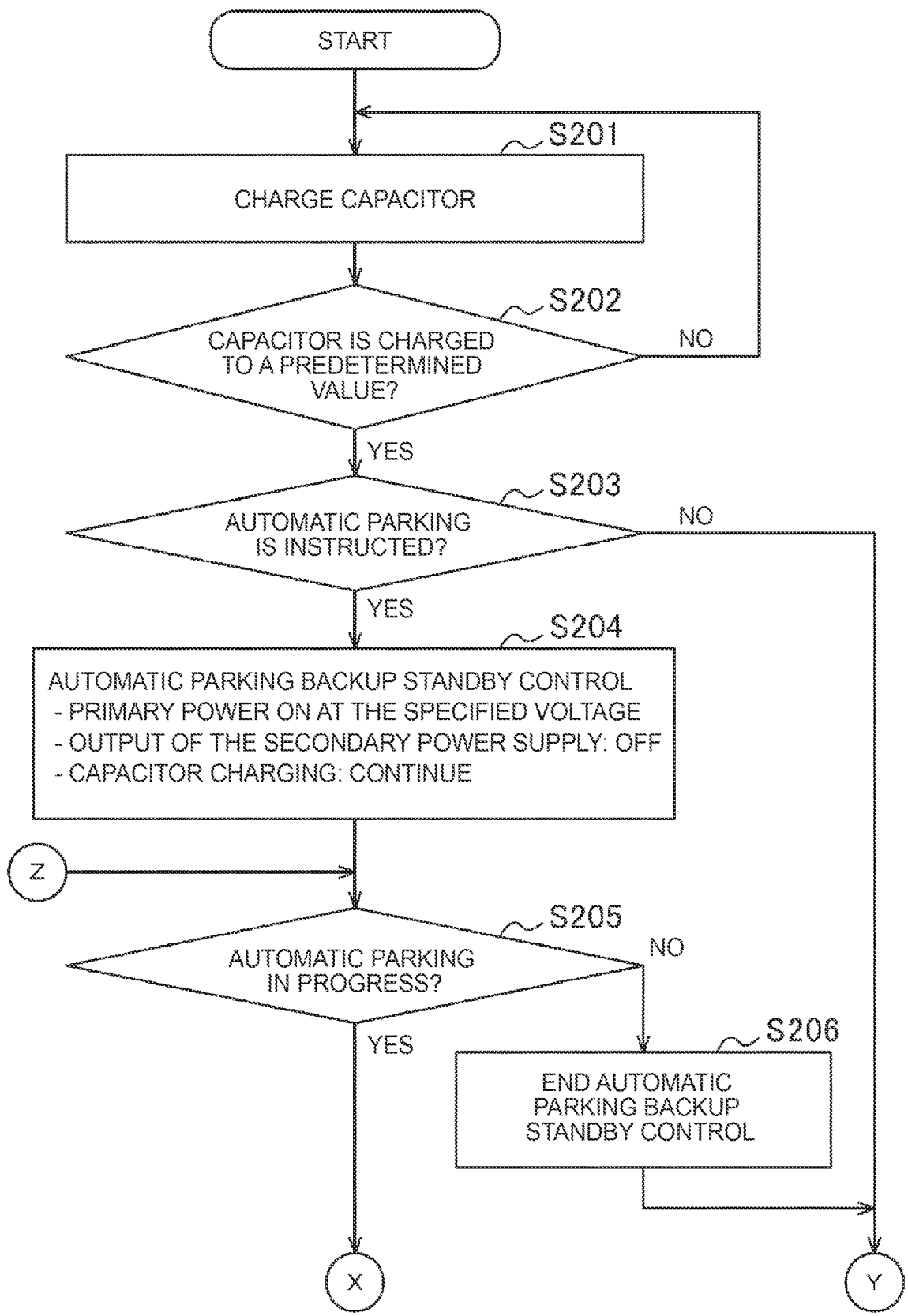
FIG. 2A is a process flow chart of the power control in the automated parking function executed by the vehicle control device according to an embodiment of the present disclosure.
Figure 2B:
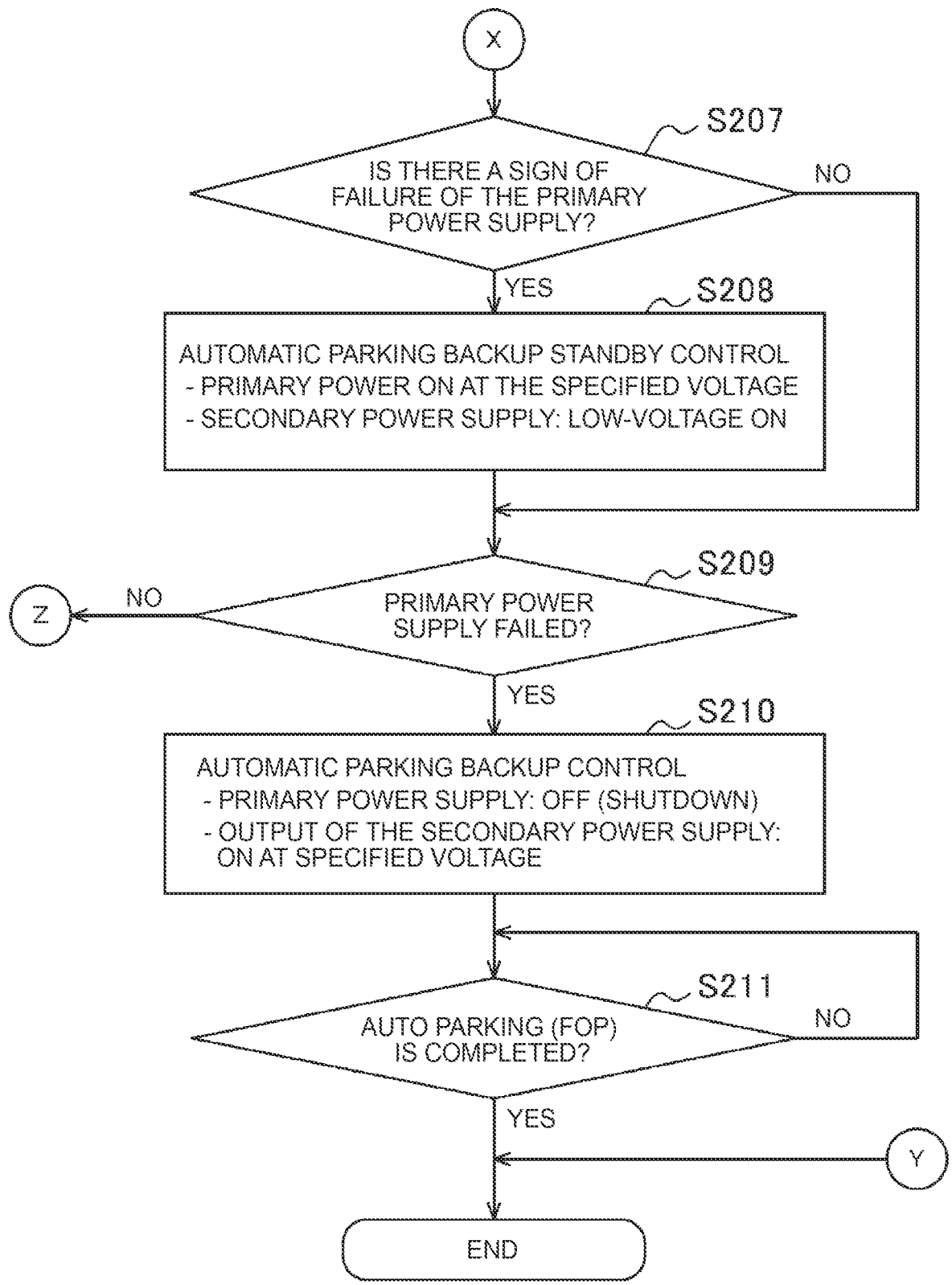
FIG. 2B shows the process flow chart of the power control in the automated parking function executed by the vehicle control device according to an embodiment of the present disclosure.

Next, the control performed by the vehicle control device 30 according to the present embodiment will be described with reference to FIG. 2A and FIG. 2B. FIG. 2A and FIG. 2B are flow charts illustrating a process of power supply control in an automated parking function executed by the vehicle control device 30. The process of FIG. 2A and the process of FIG. 2B are connected by couplers X, Y, and Z, respectively.

The power supply control in the automated parking function illustrated in FIG. 2A and FIG. 2B is started, for example, when the ignition switch of the vehicle is turned on (IGR-ON) and the vehicle system 1 is activated.

S201

The vehicle control device 30 (the first control unit 31) starts charging of the capacitor C of the secondary power supply 12 by the electric power of the primary power supply 11. When the charging process of the capacitor C is started by the vehicle control device 30, the process proceeds to S202.

S202

The vehicle control device 30 (the first control unit 31) determines whether or not the capacitor C of the secondary power supply 12 has been charged to a predetermined value. This predetermined value may be, for example, the amount of electric power required to complete the fail-safe operation defined for valet parking in the automated parking system 20 when the primary power supply 11 fails while performing valet parking. When the vehicle control device 30 determines that the capacitor C is charged to a predetermined value (S202, Yes), the process proceeds to S203. On the other hand, when the vehicle control device 30 determines that the capacitor C is not charged to the predetermined value (S202, No), the process proceeds to S201.

S203

The vehicle control device 30 (the second control unit 32) determines whether or not there is an instruction to request the automated parking system 20 to execute the automated parking function. When the vehicle control device 30 determines that there is an instruction to execute the automated parking function (S203, Yes), the process proceeds to S204. On the other hand, when the vehicle control device 30 determines that there is no instruction to execute the automated parking function (S203, No), the power control in the automatic parking is ended.

S204

The vehicle control device 30 (the second control unit 32) performs the automatic parking backup standby control (the first stage) and starts the execution of the automated parking function instructed by the vehicle. In this automatic parking backup standby control (first stage), the vehicle control device 30 causes the automated parking system 20 to output power of a prescribed voltage from the primary power supply 11 (ON at a prescribed voltage), does not cause the secondary power supply 12 to output power (OFF), and continues to charge the capacitor C. By this control, the capacitor C can be continuously charged while the automated parking function is executed, so that the power consumption of the capacitor C is suppressed. When the automated parking backup standby control (first stage) is performed by the vehicle control device 30, the process proceeds to S205.

S205

The vehicle control device 30 (the second control unit 32) determines whether or not the vehicle is executing the automated parking function. When the vehicle control device 30 determines that the automated parking function is still being executed (S205, Yes), the process proceeds to S207. On the other hand, when the vehicle control device 30 determines that the automated parking function is not being executed, that is, the automatic parking is completed (S205, No), the process proceeds to S206.

S206

Since the automatic parking of the vehicle has been completed, the vehicle control device 30 (the second control unit 32) ends the automatic parking backup standby control (the first stage). When the automatic parking backup standby control (first stage) is ended by the vehicle control device 30, the power supply control in the automatic parking is ended.

S207

The vehicle control device 30 (the third control unit 33) determines whether or not there is a sign of a failure in the primary power supply 11. When the vehicle control device 30 determines that there is a sign of failure in the primary power supply 11 (S207, Yes), the process proceeds to S208. On the other hand, when the vehicle control device 30 determines that there is no sign of failure in the primary power supply 11 (S207, No), the process proceeds to S209.

S208

The vehicle control device 30 (fourth control unit 34) performs automatic parking backup standby control (second stage). That is, the automatic parking backup standby control is changed from the first stage to the second stage. In this automatic parking backup standby control (second stage), the vehicle control device 30 causes the automated parking system 20 to output power of a specified voltage from the primary power supply 11 (ON at a specified voltage), and causes the secondary power supply 12 to output power of a low voltage (ON at a low voltage). By this control, the vehicle system 1, when there is a sign of failure of the primary power supply 11 during execution of the automated parking function, in parallel with the primary power supply 11, the secondary power supply 12 is also in a state of being able to supply power to the automated parking system 20. That is, it is possible to secure electric power for fail-safe operation of the automated parking function. When the automated parking backup standby control (second stage) is performed by the vehicle control device 30, the process proceeds to S209.

S209

The vehicle control device 30 (third control unit 33) determines whether or not the primary power supply 11 has failed. When the vehicle control device 30 determines that the primary power supply 11 has failed (S209, Yes), the process proceeds to S210. On the other hand, if the vehicle control device 30 determines that the primary power supply 11 has not failed (S209, No), the process proceeds to S205.

S210

The vehicle control device 30 (the fifth control unit 35) performs automatic parking backup control. In this automatic parking backup control, the output from the primary power supply 11 is shut off (OFF), and the electric power of the specified voltage is output from the secondary power supply 12 to the automated parking system 20 (ON at the specified voltage). By this control, it is possible to complete the fail-safe operation of the automated parking function in an emergency. When the auto parking back-up control is performed by the vehicle control device 30, the process proceeds to S211.

S211

The vehicle control device 30 (the second control unit 32) determines whether or not the automatic parking of the vehicle has ended. That is, the vehicle control device 30 determines whether or not the fail-safe operation (FOP) of the automated parking function has been completed until the end of the emergency. When the vehicle control device 30 determines the end of the automatic parking, the power supply control in the automatic parking is ended.

The power supply control in the above-described automated parking function may be applied to both remote parking and valet parking, or may be applied only to valet parking that has a longer control time than remote parking. In the remote parking in the latter instance, the capacitor C may be charged to full charge in S202. Thereafter, the automatic parking backup standby control of the second stage of S208 may be performed without performing the automatic parking backup standby control of the first stage by S204 and the sign determination of the failure of the primary power supply 11 by S207.

Operations and Effects

As described above, according to the vehicle control device 30 and the method according to the embodiment of the present disclosure, before the automated parking function is executed, the amount of electric power necessary for completing a predetermined fail-safe operation in the automated parking system 20 when the primary power supply 11 fails is charged to the capacitor C of the secondary power supply 12 in advance. Then, according to the vehicle control device 30 and the method according to the present embodiment, during the automatic parking backup standby control in which the execution of the automated parking function is started, the charging of the capacitor C of the secondary power supply 12 is continued if there is no sign of failure in the primary power supply 11, and a state in which the capacitor C of the secondary power supply 12 can be discharged only when there is a sign of failure in the primary power supply 11 is prepared.

By this control, it is possible to suppress the power consumption of the capacitor C of the secondary power supply 12 in the automatic parking backup standby control when the primary power supply 11 is normal. Therefore, it becomes possible to accumulate the amount of power required for the backup power supply in the capacitor C during the automatic parking backup standby control, and it is possible to perform the fail-safe operation of the automated parking function by the secondary power supply 12 even if the primary power supply 11 fails. That is, according to the present disclosure, it is possible to achieve both suppression of power consumption of the capacitor C and control of fail-safe operation.

Therefore, even if the capacitor C of the secondary power supply 12 has a capacity set on the assumption of remote parking, it is possible to increase the amount of accumulated electric power of the capacitor C during the automatic parking backup standby control. Therefore, the fail-safe operation of the valet parking in which the amount of electric power required for the fail-safe operation is larger than that of the remote parking can be performed without any problem. That is, according to the present disclosure, it is possible to divert the redundant power supply system 10 for remote parking to valet parking without increasing the capacitance of the capacitor C, that is, without increasing the cost of the redundant power supply system 10 or increasing the housing size.

The vehicle control device and method of the present disclosure can be used to control a redundant power supply system when an automated parking function is executed in a vehicle.

What is claimed is:

1. A vehicle control device configured to control a redundant power supply system including a primary power supply and a secondary power supply configured to supply electric power to an automated parking system, the vehicle control device comprising:
a processor configured to:
charge a power storage element of the secondary power supply to a predetermined value;
execute an automated parking function by outputting first electric power at a specified voltage from the primary power supply to the automated parking system while continuing to charge the power storage element when the power storage element is charged to the predetermined value;

detect a sign of failure of the primary power supply during execution of the automated parking function; and output second electric power at a voltage lower than the specified voltage from the secondary power supply to the automated parking system in parallel with the first electric power when the sign of failure of the primary power supply is detected.

2. The vehicle control device according to claim 1, wherein:

the automated parking function includes remote parking and valet parking; and the processor is further configured to detect the sign of failure of the primary power supply when a first condition is satisfied during the remote parking, and detect the sign of failure of the primary power supply when a second condition different from the first condition is satisfied during the valet parking.

3. The vehicle control device according to claim 1, wherein the predetermined value of charging of the power storage element is an amount of electric power required to complete fail-safe operation when the primary power supply fails in the automated parking system.

4. The vehicle control device according to claim 1, the processor is further configured to output third electric power at the specified voltage from the secondary power supply to the automated parking system when the primary power supply fails.

5. A vehicle control method to be executed by a vehicle control device configured to control a redundant power supply system including a primary power supply and a secondary power supply configured to supply electric power to an automated parking system, the vehicle control method comprising:

charging a power storage element of the secondary power supply to a predetermined value;

executing, when the power storage element is charged to the predetermined value, an automated parking function by outputting first electric power at a specified voltage from the primary power supply to the automated parking system while continuing to charge the power storage element;

detecting a sign of failure of the primary power supply during execution of the automated parking function; and outputting, when the sign of failure of the primary power supply is detected, second electric power at a voltage lower than the specified voltage from the secondary power supply to the automated parking system in parallel with the first electric power.

6. The vehicle control method according to claim 5, wherein:

the automated parking function includes remote parking and valet parking; and the detecting of the sign of failure of the primary power supply includes detecting the sign of failure of the primary power supply when a first condition is satisfied during the remote parking, and detecting the sign of failure of the primary power supply when a second condition different from the first condition is satisfied during the valet parking.

7. The vehicle control method according to claim 5, wherein the predetermined value of charging of the power storage element is an amount of electric power required to complete fail-safe operation when the primary power supply fails in the automated parking system.

8. The vehicle control method according to claim 5, further comprising outputting, when the primary power supply fails, third electric power at the specified voltage from the secondary power supply to the automated parking system.

* * * * *